United States Patent [19]

Bankston et al.

[11] Patent Number: 5,028,848
[45] Date of Patent: Jul. 2, 1991

[54] TILE VECTOR TO RASTER CONVERSION METHOD

[75] Inventors: Neil F. Bankston, San Diego; Mark A. Overton, Escondido, both of Calif.

[73] Assignee: Hewlett-Packard Company, Palo Alto, Calif.

[21] Appl. No.: 211,789

[22] Filed: Jun. 27, 1988

[51] Int. Cl.5 .......................... G09G 1/04; G09G 1/10; H01J 29/70; G06F 15/626

[52] U.S. Cl. ..................................... 315/364; 364/521; 340/739

[58] Field of Search ....................... 315/364, 365, 367; 364/521; 358/140; 340/739, 750

[56] References Cited

U.S. PATENT DOCUMENTS

| | | | |
|---|---|---|---|
| 4,205,389 | 5/1980 | Heartz | 364/54 |
| 4,254,467 | 3/1981 | Davis | 364/54 |
| 4,425,559 | 1/1984 | Sherman | 340/750 |
| 4,451,895 | 5/1984 | Sliwkowski | 364/521 |
| 4,458,330 | 7/1984 | Imsand et al. | 364/900 |
| 4,549,275 | 10/1085 | Sukonick | 364/521 |
| 4,601,002 | 7/1986 | Rosenthal et al. | 364/520 |
| 4,611,268 | 9/1986 | Gotz et al. | 364/148 |
| 4,623,880 | 11/1986 | Bresenham et al. | 340/723 |
| 4,633,243 | 12/1986 | Bresenham et al. | 340/732 |

OTHER PUBLICATIONS

"Fundamentals of Interactive Computer Graphics", James D. Foley, Andries Van Dam, Addison-Wesley Publishing Company.
"Run Length Slices for Incremental Lines," J. E. Bresenham, D. G. Grice, S. C. Pi, IBM Technical Disclosure Bulleting, vol. 22, No. 8B, Jan. 1980.

Primary Examiner—Gregory C. Issing
Attorney, Agent, or Firm—Roland I. Griffin

[57] ABSTRACT

A technique for rasterizing a line having a predetermined width and slope, including the step of providing stored data associated with predetermined slopes and widths of lines, such data including information indicative of raster data for portions of lines of the predetermined slopes and widths. The stored data associated with the slope and width of the line to be rasterized is accessed, and raster data for one of predetermined portions of the line to be rasterized is generated from the accessed data, wherein the predetermined portions collectively form the line to be rasterized. The generated raster data is copied to a bitmap memory, and the steps of generating and copying raster data are repeated until the entire line has been rasterized.

12 Claims, 10 Drawing Sheets

TILE VECTOR TO RASTER CONVERSION METHOD

BACKGROUND OF THE INVENTION

The disclosed invention generally relates to vector to raster converters for raster type plotters, printers, cathode ray tube displays, and other display systems which utilize rasterized data, and is more particularly directed to an efficient, high-speed vector to raster conversion technique which utilizes look-up tables for raster data.

As is well known, a raster display system, such as an electrostatic printer or a video display, provides images by printing or illuminating selected ones of addressable dots or pixels arranged in rows and columns called a raster matrix. Display data for each pixel (e.g., printed or blank) must be provided, and can be stored, for example, in a bitmap memory where the display information for each pixel is located at a predetermined memory location. That is, a given pixel data is associated with the pixel identified by the address where the pixel data is stored. For example, an 8-bit byte might represent the data for 8 contiguous pixels in a row of the raster for a one color display.

Plot information for plotters is often represented by a plurality of line segments, where each line segment is represented by a vector which identifies the characteristics of the line segment, such as start location, slope, and length. For example, plot data can be entered in a computer plotting system by using a computer graphics language, similar to entering a computer program. From the entered plot data, appropriate software generates vectors representing the plot, which are stored. It should be readily appreciated that vector data requires considerably less storage than the corresponding raster data.

For raster plotters, vector information must be converted to raster data. Depending on the system utilized, such conversion can be performed prior to printing of the plot or while the plot is being printed. For several reasons, many systems perform the conversion while printing. The printer would otherwise be idle if vector to raster conversion had to be completed prior to plotting, and vector data can be processed to provide usable raster data that can be plotted while vector-to-raster conversion takes place. Moreover, the amount of data storage required for storing raster data for an entire plot can be very large.

Known techniques for vector to raster conversion include what are known as digital difference analysis (DDA), major-axis Breshenham, and minor-axis Breshenham techniques. Descriptions of DDA and major-axis Breshenham techniques can be found in textbooks on computer graphics, such as *Fundamentals of Interactive Computer Graphics*, Foley and van Dam, Addison-Wesley Publishing Company, 1982. Background information on the minor-axis Bresenham algorithm can be found in *Run Length Slices for Incremental Lines*, J.E. Bresenham et al., IBM Technical Disclosure Bulletin, Vol. 22, No. 8B.

The DDA technique computes the coordinates of the next pixel on the line from the coordinates of the current pixel and the slope m according to:

$m = (Y2 - Y1)/(X2 - X1)$
$X[i+1] = X[i] + 1$ $Y[i+1] = Y[i] + m$

The pixel at coordinates $(X[i+1], \text{ROUND}(Y[i+1]))$, where ROUND identifies the rounding operation, is then chosen to represent the line. Those skilled in the art will appreciate that fixed-point arithmetic must be performed to track the Y coordinate and that the rounding operation is time consuming.

The major-axis Bresenham algorithm avoids these difficulties by using only integer arithmetic. Instead of using a fixed-point accumulator to track the Y coordinate, the algorithm maintains an integer decision variable whose arithmetic sign indicates which of candidate pixels at $(X[i+1], Y[i])$ and $(X[i+1], Y[i]+1)$ should be selected.

Both DDA and the major-axis Bresenham algorithm step along the major axis of the line and generate the raster image one pixel at a time. Bresenham revised his major-axis algorithm to step along the minor axis of the vector and generate the raster image in RUNs of pixels, where a RUN comprises adjacent pixels on the same raster row or column. For shallowly sloped vectors (i.e., vectors with RUNs of many pixels) this technique is more efficient. As the slope of the line approaches one, however, the RUN length (i.e., the number of pixels in a RUN) also approaches one, and the performance of the minor-axis algorithm degenerates to the performance of the major-axis algorithm.

With known vector to raster conversion techniques, throughput is a consideration in that the speed of the plotter might exceed the speed of conversion. Complexity of known techniques is a further consideration.

SUMMARY OF THE INVENTION

It would therefore be an advantage to provide a simple, efficient, and high speed vector to raster conversion technique.

The foregoing and other advantages are provided by a method for rasterizing a line having a predetermined width and slope which includes the step of providing stored data associated with predetermined slopes and widths of lines, such data including information indicative of raster data for portions of lines of the predetermined slopes and widths. The stored data associated with the slope and width of the line to be rasterized is accessed, and raster data for one of predetermined portions of the line to be rasterized is generated from the accessed data, wherein the predetermined portions collectively form the line to be rasterized. The generated raster data is copied to a bitmap memory, and the foregoing steps of generating and copying raster data are repeated until the entire line has been rasterized.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

In the following detailed description and in the several figures of the drawing, like elements are identified with like reference numerals.

The Overall System

Figures 1, 2, 3:
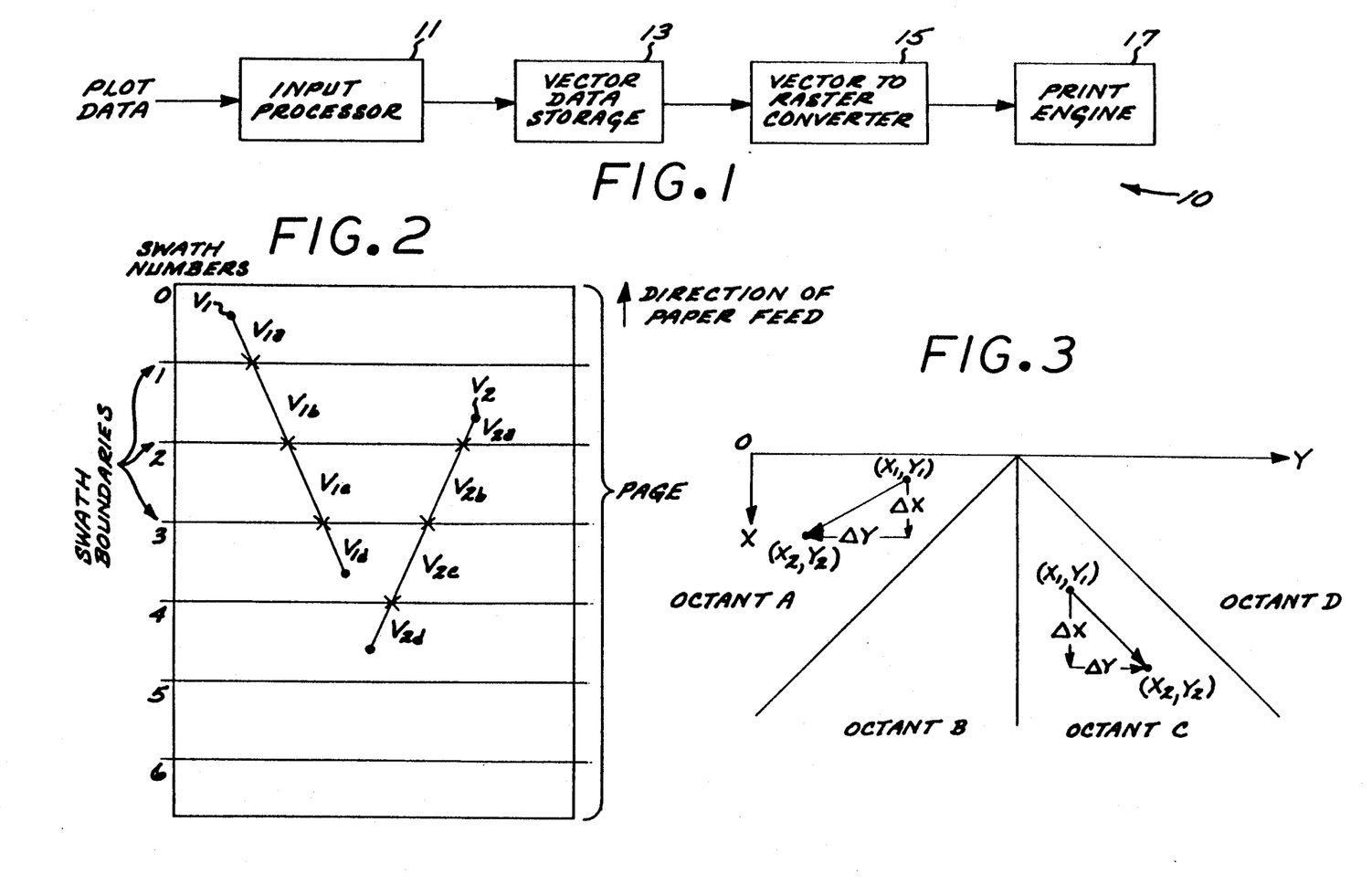
FIG. 1 is a block diagram of a raster plotter system with which the disclosed technique can be utilized.
FIG. 2 is a schematic illustration of a display area which includes swath sections.
FIG. 3 schematically illustrates the organization of lines by slope.

Referring now to FIG. 1, shown therein is a block diagram of a raster plotter system 10 which includes an input processor 11 for accepting plot data that may be in the form of a computer graphics language such as the HP-GL graphics language provided by Hewlett Packard. HP-GL is a registered trademark of Hewlett Packard. The input processor 11 processes the input plot data and generates vectors which represent line segments to be plotted. The vectors are stored in a vector data storage unit 13, which by way of example can be a hard disk memory.

The vectors stored in the vector data storage unit 13 are retrieved by a vector to raster converter 15 which under appropriate control converts the vector information to raster data which is stored in a bitmap memory. The contents of the bitmap memory are provided to a print engine 17.

Display Area Organization

Referring now to FIG. 2, by way of specific example, it is contemplated that the vector to raster converter 15 provide raster data to the print engine for only one portion of the plot called a swath. The width of a swath corresponds to the width of the plot which is perpendicular to the paper feed direction, while the height of each swath is less than the length of the plot which is parallel to the paper feed direction. By way of example, the height of a swath can be 256 pixels.

As shown in FIG. 2, a given vector in a plot can span several swaths. For each vector that spans more than one swath, the input processor 11 generates, pursuant to known techniques, clipped vectors which are within swath boundaries and which together comprise the original vector. All the vectors for a given swath are grouped together in the vector data storage unit 13.

For each swath, the vector to raster converter 15 fetches the vector data for the swath, generates and copies raster data for each vector to a bitmap memory, and provides the stored rasterized swath data to the print engine. While the rasterized data for a given swath is being outputted, the vector to raster converter fetches and rasterizes the vector data for the next swath in sequence. Thus, the vector to raster converter 15 provides pipeline processing which reduces the waiting time of the print engine 17.

The invention contemplates an efficient, high speed vector to raster conversion technique for converting selected clipped vectors to raster data. Briefly, such conversion technique is directed to fetching raster data from a look-up table pursuant to calculations based on line width, slope, start location, and length. The technique can be implemented with a microprocessor based system utilizing known architectures. For example, to achieve the pipeline processing referenced above, a microprocessor based system having two microprocessors, two bitmap memories, a crossbar switch and ROM's might be utilized.

Classifying Lines by Slope

Referring now to FIG. 3, shown therein is a diagram illustrating how vectors are assigned to octants as a function of slope. While only four octants are shown, it should be readily understood that vectors assigned to the remaining four octants have equivalent line segments in the four octants shown. In the octants A through D, the X components of the vectors are in the positive direction (i.e., X2>X1). In other words, the starting endpoint is on top, while the final endpoint is on the bottom. Vectors having negative X-going components are in the octants not shown, and can be mapped into octants A through D by exchanging the order of their end points.

The following Table I identifies the octant location of a particular line segment depending upon slope and sequence of end points:

TABLE I

| OCTANT A: | $|\Delta Y| \geq |\Delta X|$ and $\Delta Y < 0$ |
| OCTANT B: | $|\Delta Y| < |\Delta X|$ and $\Delta Y < 0$ |
| OCTANT C: | $|\Delta Y| < |\Delta X|$ and $\Delta Y \geq 0$ |
| OCTANT D: | $|\Delta Y| \geq |\Delta X|$ and $\Delta Y \geq 0$ | where $\Delta X = X2 - X1$ and $\Delta Y = Y2 - Y1$.

The following will primarily address octants C and D since octants B and A are respectively similar thereto, and by appropriate mapping, the procedures for octant C can be utilized for octant B, while the procedures to octant D can be used for octant A.

For better performance, the disclosed vector to raster conversion techniques are preferably utilized with lines within certain portions of octants C and D. Specifically, preferably only those lines having a slope greater than 14 degrees and less than 76 degrees (measured clockwise relative to the Y axis) are processed pursuant to the disclosed vector to raster conversion techniques. The lines in the remaining portions of octants C and D are rasterized pursuant to other techniques, for example with some type of known Bresenham algorithm. Corresponding slope limitations apply to octants A and B.

TILE Data Organization

Figures 4, 5:
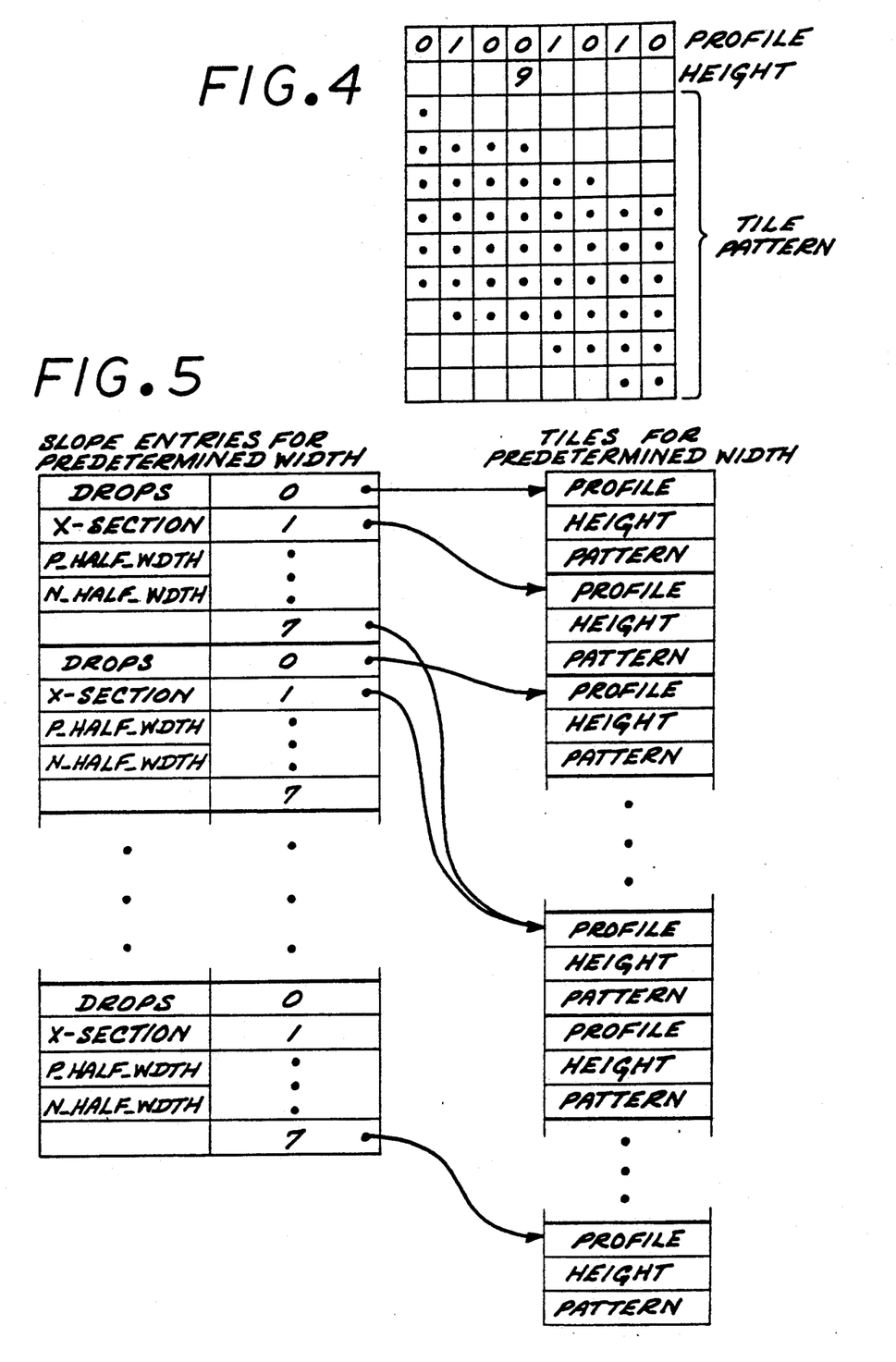
FIG. 4 schematically illustrates a block of data called a TILE which is utilized by the disclosed technique.
FIG. 5 schematically illustrates the organization of TILE data by line width and slope.

FIG. 4 schematically illustrates a block of data generally called a TILE, which can be considered as comprising a stack of 8-bit bytes. The top byte contains PROFILE data which, as described later, is used to rasterize vectors in octant C; the next byte includes HEIGHT data which specifies the number of stacked bytes in the PATTERN data stored in the succeeding bytes. The bottom H bytes include the PATTERN data. The PATTERN data is 8 bits wide and is copied for rasterizing vectors in octant D.

In the following discussion, for convenience, the term TILE is used to refer to raster data that is based on the foregoing TILE data, and is also used to refer to the section of the raster that is defined by utilizing TILE data. Further, TILE might be used to refer to the portion of the bitmap memory associated with the section of the raster display that is defined by utilizing TILE data. It is believed that such uses of the term TILE will facilitate understanding, and ambiguities are avoided by making the context clear.

It is contemplated that the bitmap memory is cleared prior to vector to raster conversion. Raster data is copied to the bitmap memory by ORing the data with the contents of the destination bitmap memory locations. This prevents the erasure of bits that have been set by prior conversions of other vectors for the swath being processed.

FIG. 5 schematically illustrates the organization of TILES by line width and slope. For each of predetermined line widths (which may be specified by default or by input plot data), data entries are provided for N different slopes. Specifically, for each slope of a given width, data entries include DROPS, X-SECTION, P_HALF_WIDTH, and N_HALF_WIDTH.

Figure 6:
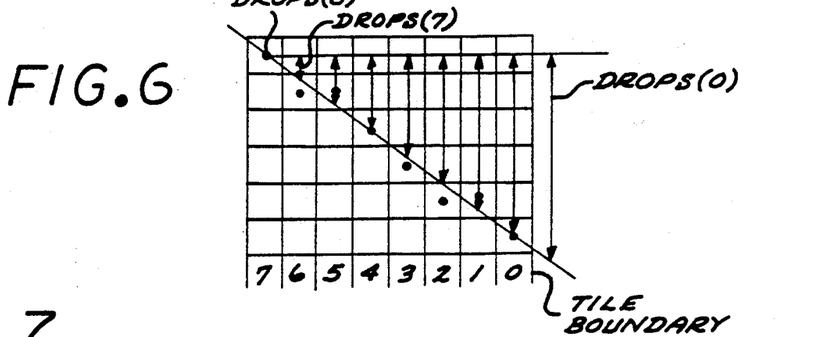
FIG. 6 schematically illustrates the significance of the data entries drops in the TILE data.

With reference to FIG. 6, DROPS is an array with nine entries specifying how far the mathematical or actual line has dropped relative to the start of the TILE which is at the top left corner. By way of example, each entry corresponds to an index (0 through 8, indicating bit location) multiplied by the slope, and specifies the drop. As discussed further herein, DROPS is useful handling the partial TILES that can occur at the ends of the lines in octant D.

Figure 7:
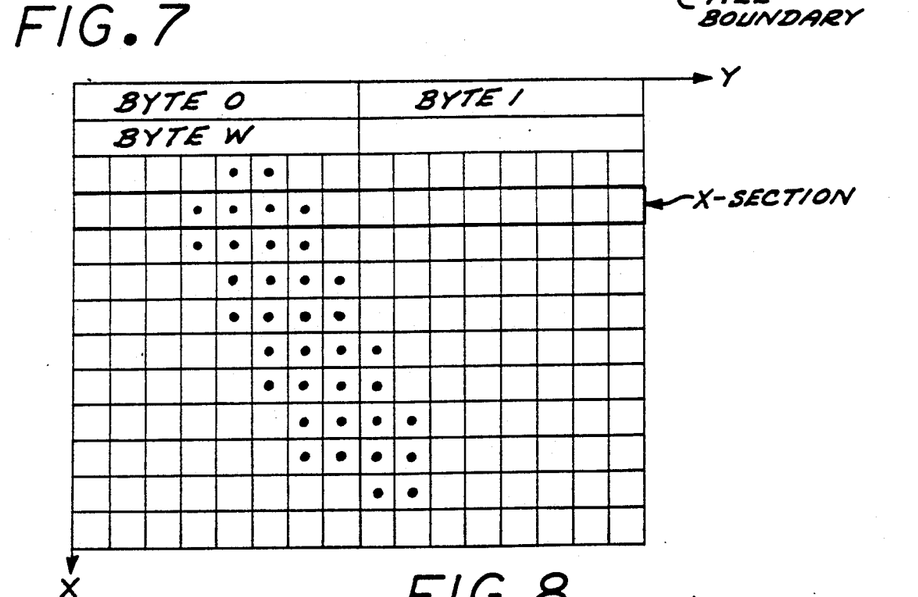
FIG. 7 schematically illustrates the significance of the X-SECTION data in the TILE data.

With reference to FIG. 7, X-SECTION is a group of 2 or 4 adjacent bytes having specified bits set, and represents a cross-section of a vector in octant C. FIG. 7 is a raster representation of the X-SECTION data, wherein the dotted pixels represent the bits that are set. Briefly, the raster data for each TILE of a line in octant C is determined by copying to the bitmap memory the X-SECTION data as selectively shifted pursuant to the PROFILE of each TILE. That is, the raster data for each row of pixels of a TILE in octant C is based on the X-SECTION data as appropriately shifted.

The set bits for the X-SECTION data depend on the associated line width and, by way of example, can be centered on predetermined bit locations. Appropriate processing will keep track of the shifts utilized to center the X-SECTION data on the line being rasterized.

Figure 8:
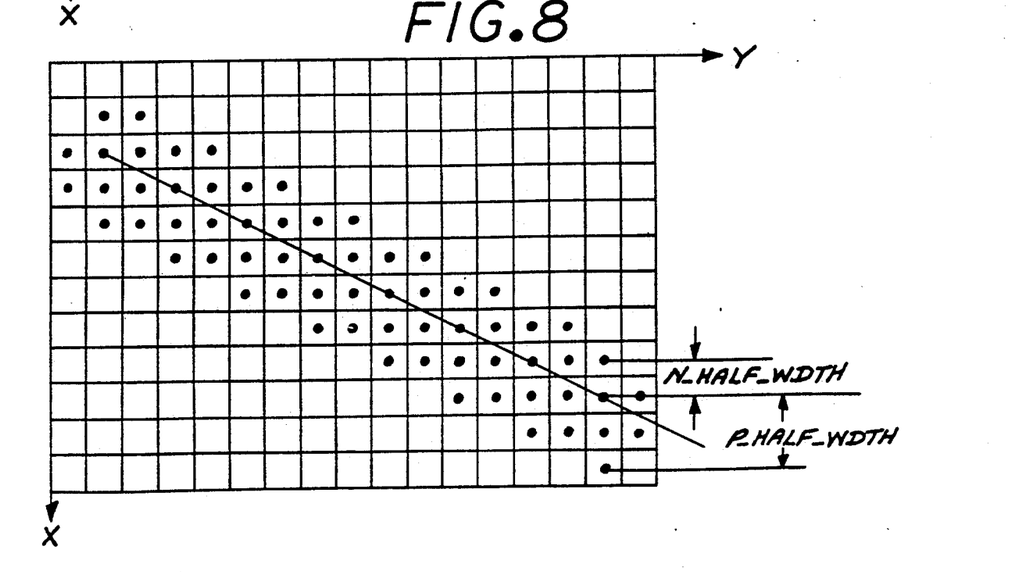
FIG. 8 schematically illustrates the significance of P_HALF_WIDTH and N_HALF_WIDTH data of the TILE data.

Referring now to FIG. 8, P_HALF_WIDTH and N_HALF_WIDTH specify the distance in pixels between a point on the mathematical line and the boundaries of its raster image, taken in the positive and negative X (vertical) directions. P_HALF_WIDTH is measured in the positive direction while N_HALF_WIDTH is measured in the negative direction.

Referring again to FIG. 5, the data entries for a given slope and width further include pointers 0 through 7, which contain addresses of predetermined TILES. Pointers are utilized instead of storing the actual TILES since the TILES for a given slope can include one or more TILES that are the same as the TILES for another slope. Accordingly, the use of pointers reduces the memory required for storing the TILES.

Figure 9:
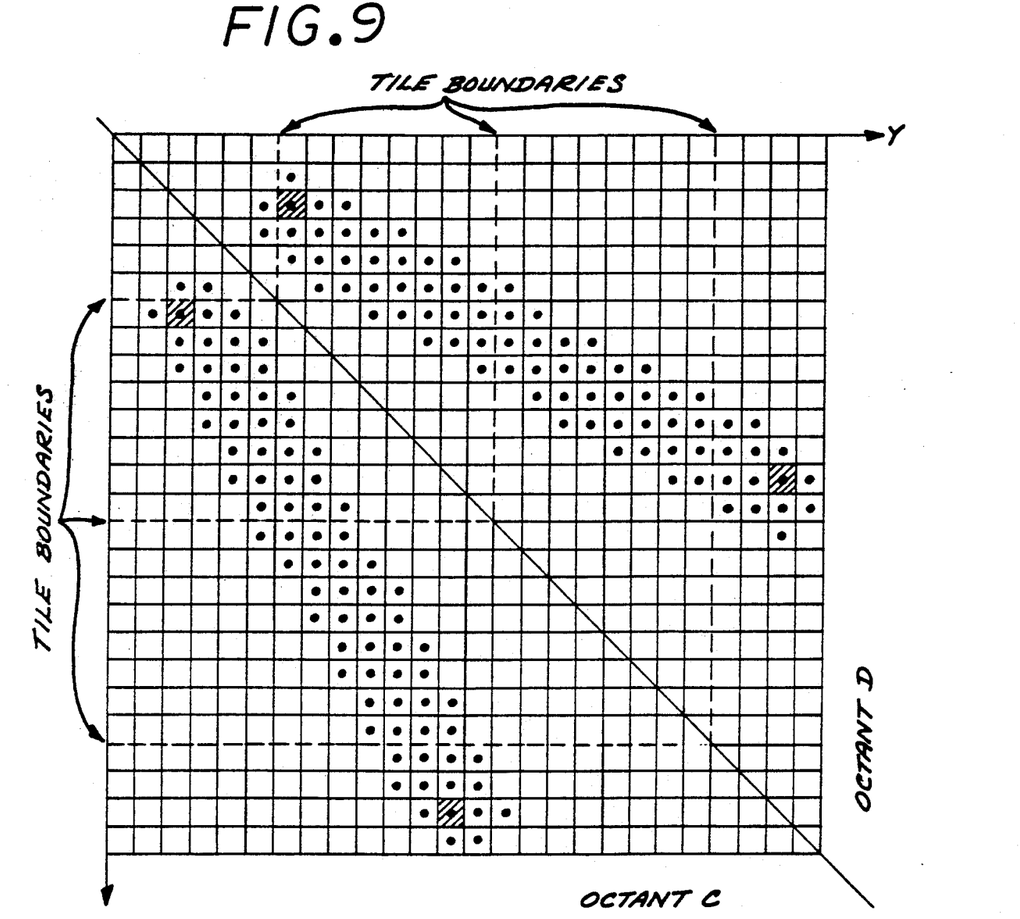
FIG. 9 schematically illustrates the use of raster data generated pursuant to the TILE data.

Referring now to FIG. 9, shown therein is a raster diagram which illustrates the use of the TILE data. Each square represents a pixel, and pixels that are set are indicate with dots. The shaded pixels indicated the end points of the line segments. Processing of a TILE stores a block of raster data in the bitmap memory which corresponds to a rectangular section of the raster display. In octant C the tile boundaries are parallel to the Y axis, while in octant D they are parallel to the X axis. In octant C, raster data for a TILE is generated by selectively shifting and storing the X-SECTION data, while in octant D, raster data for a TILE is generated by copying the PATTERN data.

Raster Coordinates and Bitmap Memory Locations

Figure 10:
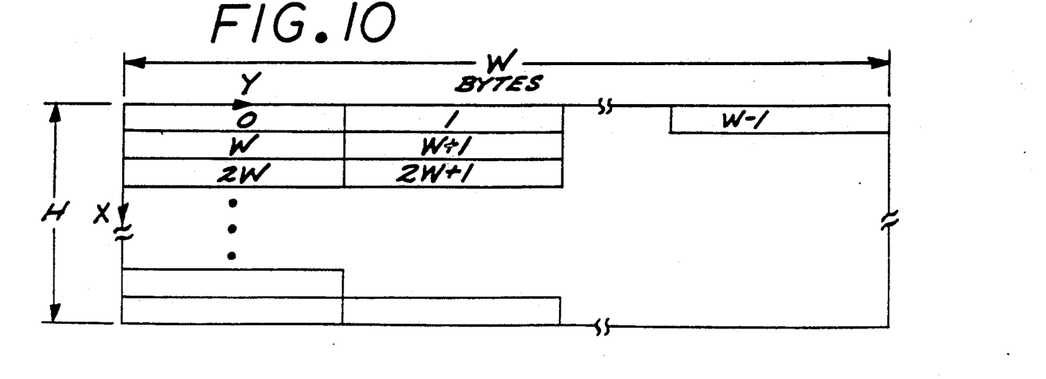
FIG. 10 is a raster diagram which schematically illustrates the relation between Cartesian coordinates (X,Y) and bitmap memory coordinates.

FIG. 10 is a raster diagram which illustrates the relation between Cartesian coordinates (X,Y) and bitmap memory coordinates (byte address A, bit location B) for a swath of width W bytes and of height H pixels. By way of specific example, each byte is 8 bits wide and therefore the width in pixels is 8*W pixels.

The (X,Y) coordinates are defined by pixel location. Thus, for example, the pixel at the upper left corner would have (X,Y) coordinates of (0,0) while the 12th pixel from the left in the second row would have coordinates of (1, 11).

The byte addresses A (shown in FIG. 10) are sequential starting with byte 0 in the upper left corner. The byte address A and the bit location B within that byte are calculated as follows:

$$A = (X * W) + (Y \, DIV \, 8) \qquad \text{(Eq. 1)}$$

$$B = (Y \, MOD \, 8) \qquad \text{(Eq. 2)}$$

where the asterisk (*) indicates multiplication; DIV indicates integer division; and MOD indicates modular arithmetic, i.e., the result is the remainder of division by 8.

In octant C, the TILE boundaries are 8 pixels apart and can begin at any row. For octant D, the TILE boundaries are coincident with the byte boundaries.

Calculating Set-up Values

Figure 11:
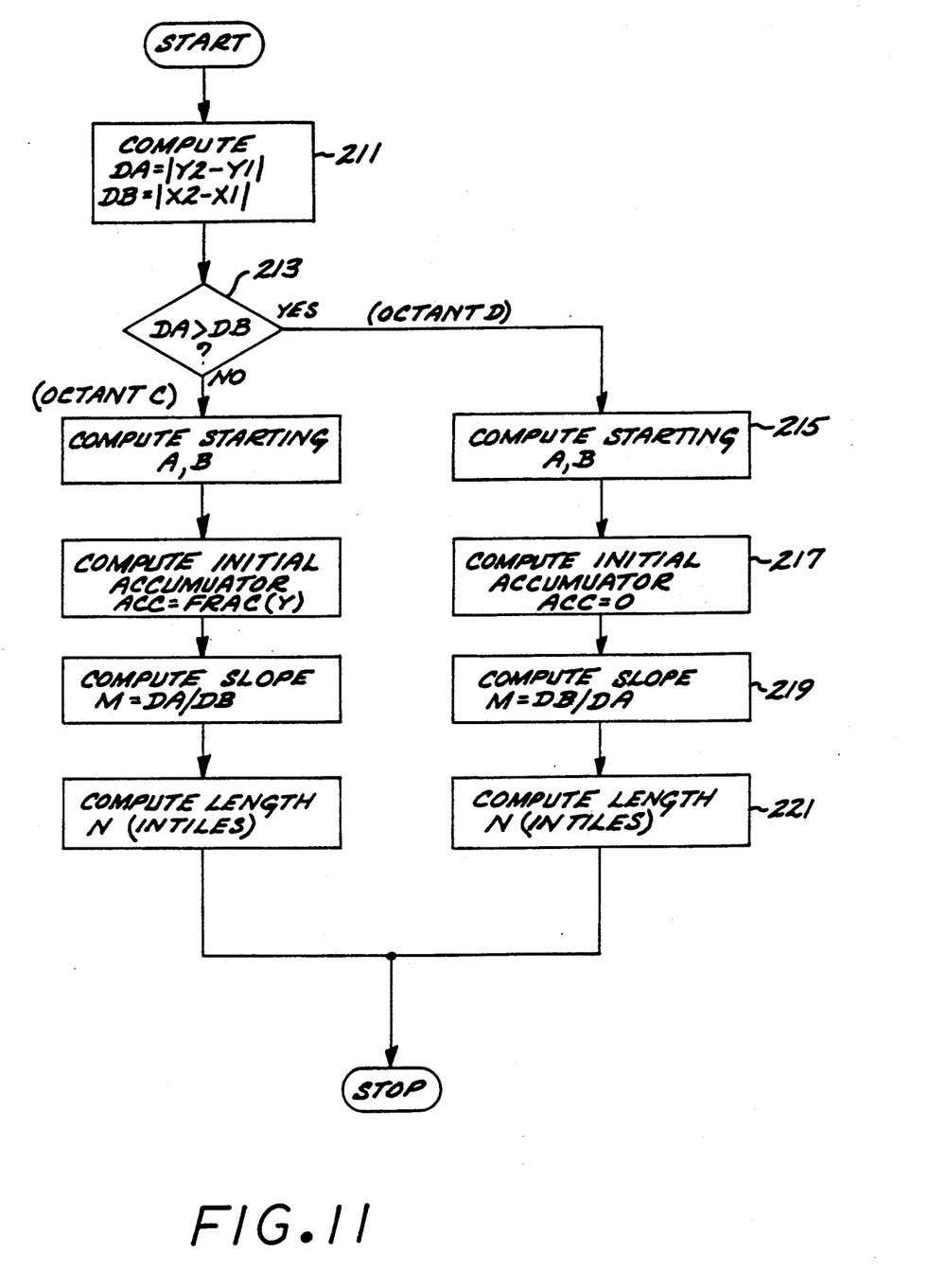
FIG. 11 sets forth a flow diagram of the set-up process for calculating set-up values utilized in selecting the appropriate TILE data.

Referring now to FIG. 11, shown therein is a flow diagram of the set-up process for calculating set-up values utilized in selecting the appropriate TILE data for a given line having (X1,Y1) and (X2,Y2) as its end points. Pursuant to the function block 211 the lengths of the X and Y components are calculated. Pursuant to a decision block 213, a determination is made as to whether the line is in octant C or octant D. If the length of the Y component is greater than the length of the X component, then the processing for octant D proceeds; otherwise, the processing for octant C proceeds.

For processing of a vector in octant D, the byte address and bit location (A,B) of the first endpoint are calculated pursuant to function block 215 in accordance with Equations 1 and 2. Then, pursuant to function block 217, an initial accumulator value is calculated. That accumulator value and its significance will be discussed further herein.

Pursuant to the function block 219, the slope M of the line is calculated, where X is the dependent variable (i.e., the change in X is in the numerator). By way of example, the TILE data for different slopes of a given line width in octant D can be addressed by the K most significant bits of the slope M:

$$K = CEILING[\log_2(N)] \qquad (Eq. 3)$$

where N is the number of discrete slopes utilized by the system for octant D, and CEILING denotes the smallest integer greater than or equal to the argument $\log_2(N)$.

The length N in whole TILES is calculated pursuant to the function block 221. The total number of TILES NT is:

$$NT = (Y2 \; DIV \; 8) - (Y1 \; DIV \; 8) + 1 \qquad (Eq. 4)$$

while the number of whole or internal TILES N is:

$$N = MAX[0, (NT-2)] \qquad (Eq. 5)$$

To the extent that the ends of a vector do not coincide with a TILE boundary, partial TILES are utilized as discussed more fully herein.

The calculations for octant C are similar, except that the number of TILES is calculated in the X direction, and the starting TILE boundary at the top is adjusted to coincide with the beginning endpoint. Thus, for octant C, only one partial TILE will be used. The number of whole TILES N is:

$$N = [(X2 - X1) \; DIV \; 8], \text{ if } [(X2 - X1) \; MOD \; 8] < > 7 \qquad (Eq. 6)$$
$$= [(X2 - X1) \; DIV \; 8] + 1, \text{ if } [(X2 - X1) \; MOD \; 8] = 7$$

where DIV denotes integer division. Also, in calculating the slope M, Y is the dependent variable (i.e., the change in Y is in the numerator). As with lines in octant D, the TILE data for different slopes of a given line width in octant C can be addressed by the K most significant bits of the slope M as calculated for octant C, where K is calculated pursuant to Equation 3 above. As defined previously, the TILE data for a given slope and width includes information for lines in both octants C and D.

Figure 12:
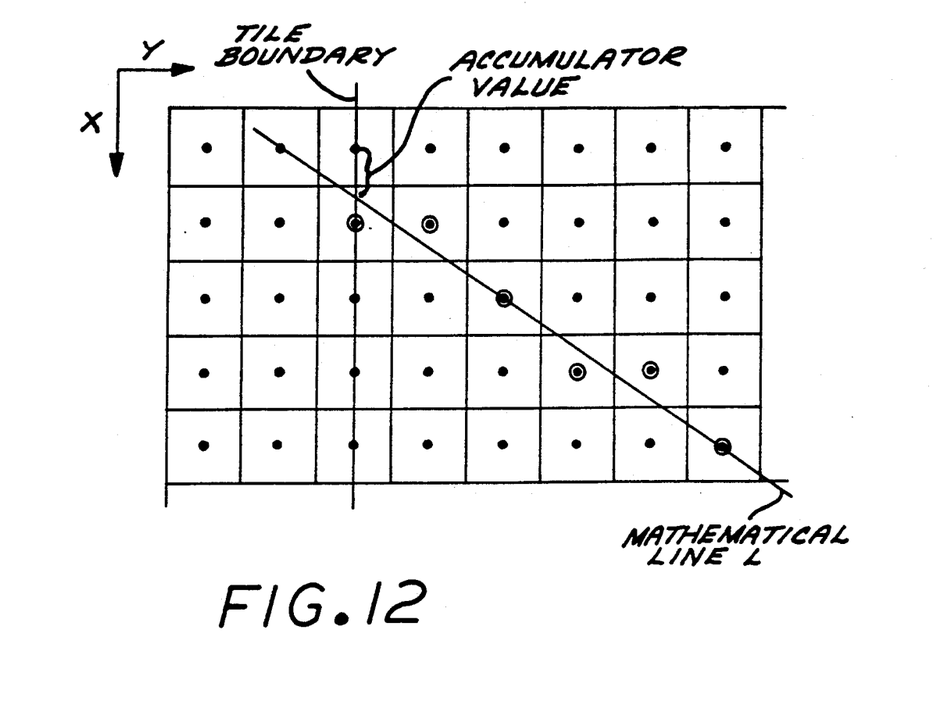
FIG. 12 schematically illustrates the use of an accumulator value for tracking the location of the mathematical line relative to candidate pixels.

The accumulator value ACC is intended to be indicative of the distance of the mathematical line from candidate pixels that might be used to represent the line. Referring specifically to FIG. 12, wherein set pixels are circled, for a given integral Y coordinate of the line, the distance in the positive X direction from a candidate pixel is the fractional part of the corresponding X coordinate. For a given integral X coordinate of the line, the distance in the positive Y direction for a candidate pixel is the fractional part of the corresponding Y coordinate. Each of these distances can be calculated from the slope of the line.

In the use of TILE data, the accumulator value ACC for a line in octant C is measured in the X direction, while the accumulator value ACC for a line in octant D is measured in the Y direction. This corresponds to the orientation of the TILE boundaries and the different slope calculations for the different octants.

It should be appreciated that for a line of a given slope and width, different raster patterns would be used to represent different sections of the line depending upon the intersection of the mathematical line with a TILE boundary, which can be defined by the accumulator value ACC. Thus, such different sections of a line can be associated with different values of the accumulator value ACC. As a particular example, the accumulator value ACC can comprise three bits which can have eight different values. For each of the eight values, each indicating a different intersection of the line with a TILE boundary, a different section of the line can be rasterized pursuant to a known technique, such as the digital difference algorithm referenced in the background. The raster information for the eight different sections are utilized to define the PATTERN and PROFILE data for the eight TILES associated with a given slope and width, whereby TILE data in essence represents pre-rasterized data.

For initialization purposes, the initial accumulator value ACC of a line in octant D is zero, since a vector always begins at an integral X coordinate, whether it is the actual start of a vector within a swath or the continuation of a vector at a swath boundary. For a line in octant C, the initial accumulator value ACC is the fractional portion of the Y coordinate of the start endpoint.

Vector-to-Raster Conversion of Lines in Octant D

Figure 13:
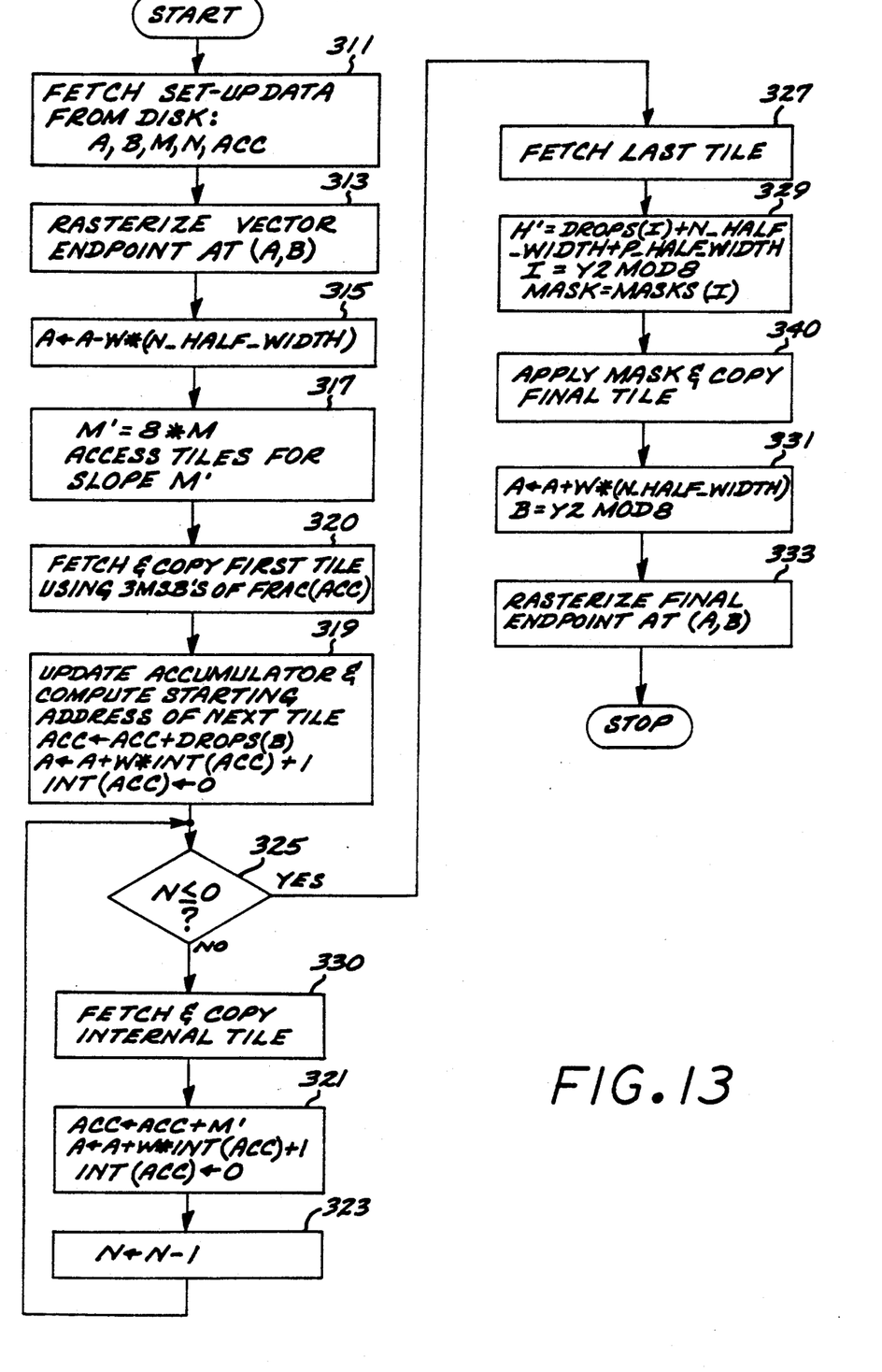
FIG. 13 sets forth a flow diagram of the process of generating and storing raster data for a line in a particular octant.

FIG. 13 sets forth a flow diagram of the process of generating TILE raster data and copying such raster data to the bitmap memory for a line in octant D. The following specific embodiment is directed to processing lines that cross a TILE boundary, but can be readily modified to convert lines that do not cross a TILE boundary, which can also be processed with other techniques.

Pursuant to the function block 311, the set-up data calculated pursuant to the flow diagram of FIG. 11 is fetched. Such set-up data includes the first endpoint (A,B) of the line to be rasterized, the slope M of the line, the initial accumulator value ACC, and the number of whole TILES N to be used.

Pursuant to the function block 313, the raster data for the starting end portion is copied to the bitmap memory. By way of example, such end portion comprises a rectangular array of pixels generally centered about the starting endpoint (A,B) and matched to the line width. Pursuant to the function block 315, the byte starting address A is updated by reducing the vector endpoint byte address A by the quantity [W*N_HALF_WIDTH].

Pursuant to the function block 317, a scaled slope M' for use in subsequent calculations is calculated by multiplying the previously calculated slope M by 8. Also, the TILE data for the slope M' is accessed.

Pursuant to the function block 320, the TILE data for the first TILE, which may be a partial TILE, is fetched and copied to the bitmap memory. The TILE selected is determined by the three most significant bits of the fractional portion of the accumulator value ACC. The functions provided pursuant to the function block 320 will be discussed further herein.

Pursuant to the function block 319, the accumulator value ACC is updated by adding DROPS(B) to the current value thereof, where B is the bit location of the starting endpoint. Also, the byte address A is updated by adding [W*INT(ACC)+1] to the current value thereof, where INT(ACC) refers to the integer portion of the accumulator value ACC. After the starting address A is updated, the integer portion of the accumulator value ACC is set to zero.

As indicated by a decision block 325, a determination is made as to whether the number of whole TILES N has reached zero. If N is less than or equal to zero, control transfers to the function block 327; otherwise, control transfers to the function block 330 to fetch and copy another internal TILE.

Pursuant to the function block 330, a TILE is fetched and the raster data is copied to the bitmap memory. The functions provided pursuant to the function block 330 will be discussed in further detail herein.

Pursuant to the function block 321, the accumulator value ACC is updated by adding the scaled slope M' to the current value of ACC. Also, the byte address A is updated by adding the quantity [W*INT)(ACC)+1] to the current value thereof. After the byte address A is updated, the integer portion of the accumulator value ACC is set to zero. Pursuant to the function block 323, the number of whole TILES N is decremented by one. Processing then continues with the decision block 325.

After the number of whole TILES N has reached zero, the data for the last TILE is fetched pursuant to the function block 327. Since the last TILE could be a partial TILE, some extra processing is provided pursuant to the function block 329. An index I is assigned the value of (Y2 MOD 8), which specifies the number of bit columns occupied by the line from the left boundary of the last TILE. A height H' is calculated as follows:

$$H' = DROPS(I) + N\_HALF\_WIDTH + P\_HALF\_WIDTH \quad \text{(Eq. 6)}$$

A MASK(I) is fetched from a mask table on the basis of the calculated index I. Pursuant to the function block 340, the last TILE is AND'd with MASK(I) to clear the bits not used for the final partial TILE, and the result is copied to the bitmap memory. The functions provided by the function block 340 will be discussed in further detail herein.

Pursuant to the function block 331, the byte address A of the final endpoint is calculated by adding the quantity [W*(N\_HALF\_WIDTH)] to the current value of A, and the bit location B of the final endpoint is calculated by (Y2 MOD 8). Pursuant to the function block 333, the raster data for the final end portion is copied to the bitmap memory. Basically, such end portion comprises a rectangular array of pixels generally centered about the final endpoint (current values of A and B) and matched to the line width. Rasterization of a vector in octant D is now complete.

Figure 14:
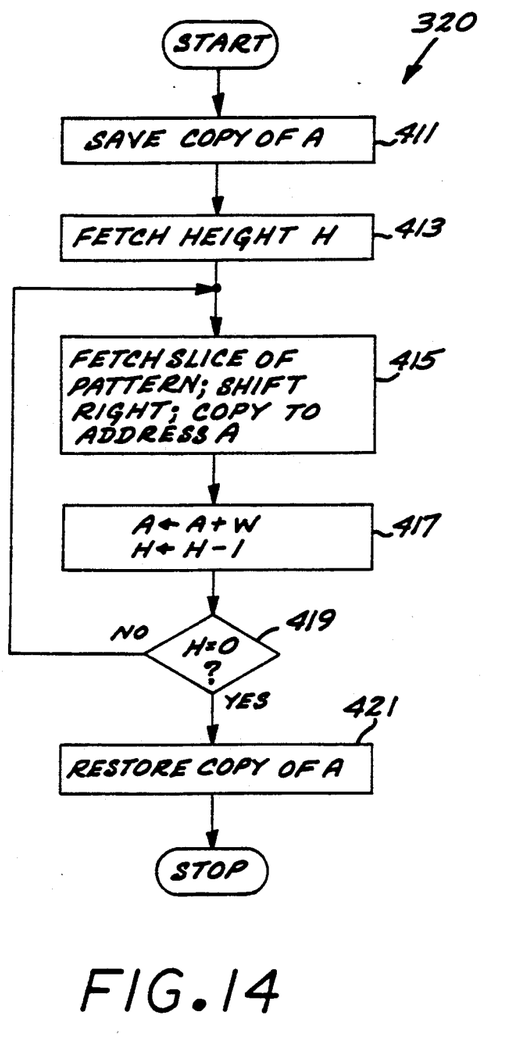
FIG. 14 sets forth a flow diagram which illustrates in greater detail certain functions provided pursuant to the flow diagram of FIG. 13.

Referring now to FIG. 14, shown therein is a flow diagram illustrating in greater detail the functions provided pursuant to the function block 320 of FIG. 13 for fetching and copying the raster data for the first TILE. Pursuant to the function block 411, a copy of the start address A for the first TILE is saved. The height H is fetched from the selected TILE table as indicated by the function block 413. The height H is used as a pointer to a specific one of the stacked bytes (slices) comprising the PATTERN, with the top slice corresponding to the height H as fetched from the table.

Pursuant to the function block 415, the slice (one byte) of the PATTERN corresponding to the current value of the height H is fetched and shifted right by (7-B) places. The shifted-out bits are discarded and the shifted-in bits are zeroes. The shifted slice is copied to the byte address A.

Pursuant to the function block 417, the byte address A is incremented by W (the raster width in bytes), which addresses the byte address corresponding to the raster pixels below the pixels corresponding to the prior byte address A. The height H is decremented by one.

As indicated by a decision block 419, a determination is made as to whether the height H has reached zero. If it has not, control transfers to the function block 415 to fetch and shift another slice of the PATTERN. If the height H has reached zero, the TILE starting byte address A is restored from the saved copy, and the process for fetching and copying the first TILE is complete.

Figure 15:
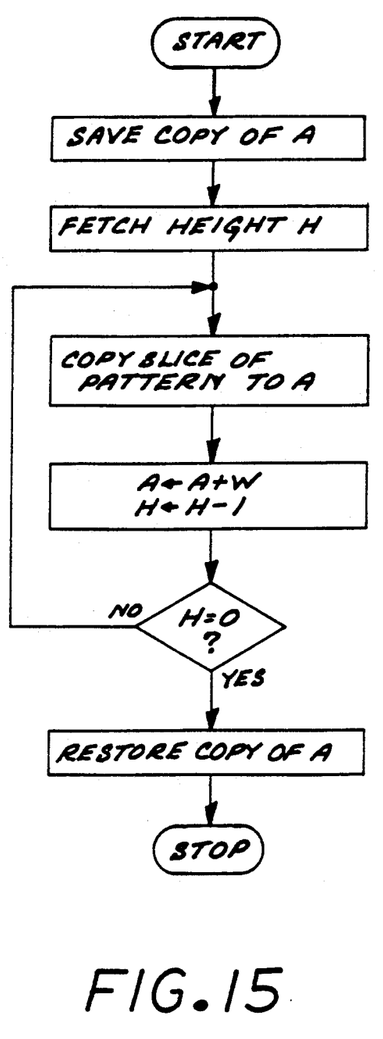
FIG. 15 sets forth a flow diagram illustrating in greater detail certain functions provided pursuant to the flow diagram of FIG. 13.

Referring now to FIG. 15, shown therein is a flow diagram illustrating in greater detail the functions provided pursuant to the function block 330 of FIG. 13 for fetching and copying a whole TILE. Pursuant to the function block 511, a copy of the current start address A is saved. The height H is fetched from the selected TILE table as indicated by the function block 513. The height H is used as a pointer to a specific one of the stacked bytes (slices) comprising the PATTERN with the top slice corresponding to the height H as fetched from the TILE table.

Pursuant to the function block 515, the slice of the pattern corresponding to the current value of the height H is copied to the byte identified by the address A.

Pursuant to the function block 517, the byte address A is incremented by W (the raster width in bytes), and the height H is decremented by one.

As indicated by a decision block 519 a determination is made as to whether the height H has reached zero. If not, control transfers to the function block 515 to copy another slice of the PATTERN. If the height H has reached zero, the byte address A is restored to the saved starting byte address, and the process for fetching a whole TILE is complete.

Figure 16:
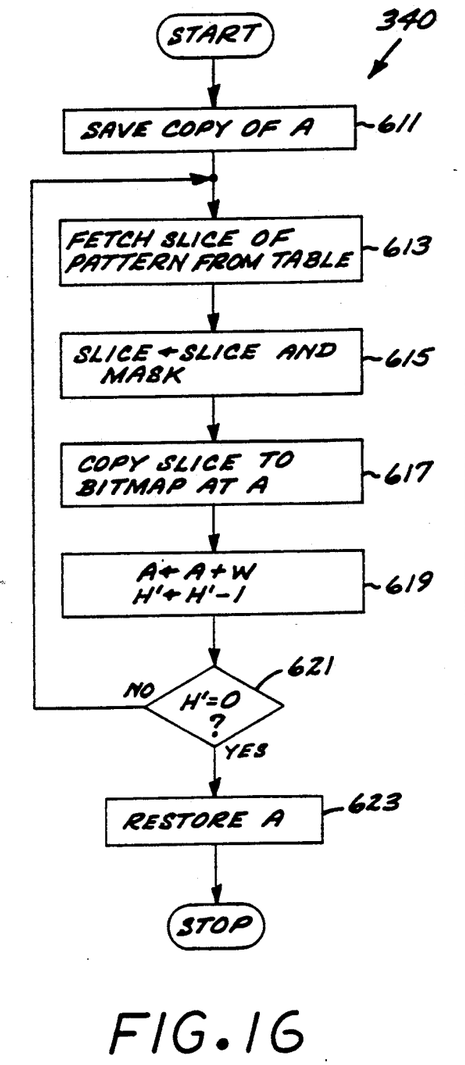
FIG. 16 is a flow diagram illustrating in greater detail certain functions provided pursuant to the flow diagram of FIG. 13.

Referring now to FIG. 16, shown therein is a flow diagram illustrating in greater detail the functions provided pursuant to the function block 330 of FIG. 13 for fetching and copying the last TILE. Pursuant to the function block 611, a copy of the current TILE start address A is saved.

Pursuant to the function block 613, the slice (one byte) of the PATTERN corresponding to the current value of the height H' is fetched from the TILE table. The slice is AND'd with the MASK (B) and the the resulting byte is copied to the bitmap memory at the byte address A.

Pursuant to the function block 619, the byte address A is incremented by W, and the height H' is decremented by one.

A determination is made pursuant to a decision block 621 as to whether the height H' has reached zero. If it has not, control transfers to the function block 613 to fetch another slice of the PATTERN. If the height H' has reached zero, the starting byte address A is restored from the saved copy, and the process for fetching and copying the last TILE is complete.

Vector-to-Raster Conversion of Lines in Octant C

The following discussion regarding a specific embodiment for vector-to-raster conversion of lines in octant C by use of TILES is directed to lines that occupy more than 8 pixels in the X direction. It can be readily adapted to handle shorter lines, which can also be rasterized pursuant to known techniques.

Figure 17:
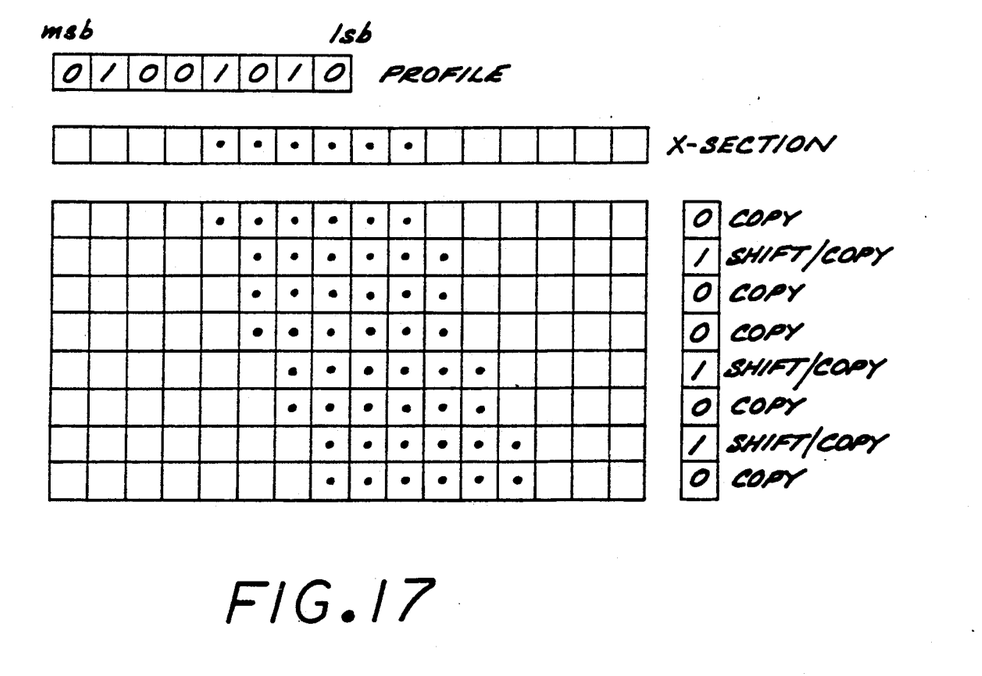
FIG. 17 illustrates the result of applying the PROFILE data to the X-SECTION associated with the particular TILE data of FIG. 4.

As mentioned earlier, the PROFILE data and the X-SECTION data are utilized to provide raster data for vectors in octant C. Specifically, the PROFILE data is scanned from the most significant bit (MSB) to the least significant bit (LSB), which is left to right in the schematic representation of FIG. 4. FIG. 17 illustrates the result of applying the PROFILE data to the X-SECTION data associated with the TILE data of FIG. 4. Specifically, a zero bit in the PROFILE indicates that the current X-SECTION data is to be copied as is, while a one bit indicates that the current X-SECTION should be shifted by one pixel (bit) and then copied. The PROFILE data and the X-SECTION data in essence cooperate to create a bitmap image of the PATTERN data that is rotated 90 degrees clockwise and mirrored about a line parallel to the X-axis.

Figure 18:
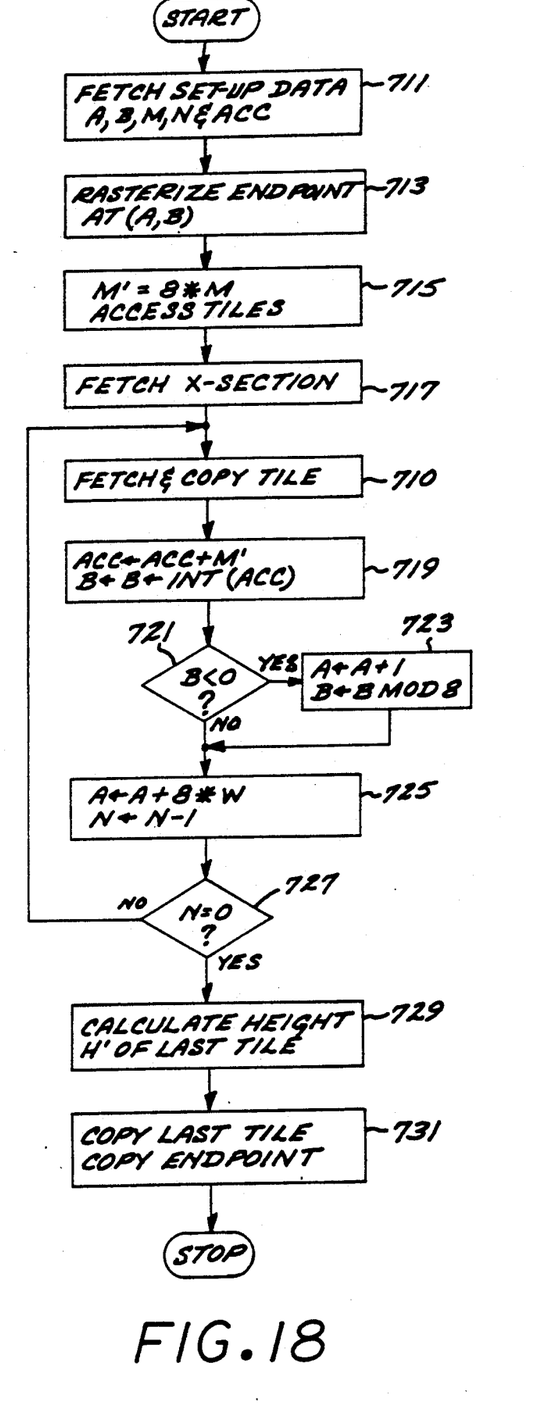
FIG. 18 sets forth a flow diagram for rasterizing a line in another octant.

Referring now to FIG. 18, shown therein is a flow diagram for rasterizing a line in octant C. Pursuant to the function block 711, the set-up data calculated pursuant to the flow diagram of FIG. 11 is fetched. Such set-up data includes the start address (byte address A, bit location B) of the vector to be rasterized, the slope M of the line, the initial accumulator value ACC, and the number of complete TILES N to be used. It should be noted that in octant C, the starting TILE boundary is adjusted to coincide with the beginning (top) endpoint of the vector to be rasterized. Thus, only one end of a line in octant C will require a partial TILE.

Pursuant to the function block 713, the raster data for the starting end portion is copied to the bitmap memory. Basically, such end portion comprises a rectangular array of pixels generally centered about the endpoint (A,B) and matched to the line width.

Pursuant to the function block 715, a scaled slope M' is calculated by multiplying the previously calculated slope M by 8. This scaled slope M' will be utilized in subsequent calculations. Also, pursuant to the function 715, the TILE data for the slope M' is accessed. Pursuant to the function block 717, the X-SECTION data is fetched.

Pursuant to the function block 710, a selected TILE is fetched and copied to the bitmap memory. The function provided pursuant to the function block 710 will be discussed in further detail herein.

Pursuant to the function block 719, the accumulator value ACC is updated by adding the scaled slope M' thereto. Also, the bit address B is updated by subtracting the integer portion of the accumulator AC from the current value of B.

As indicated by a decision block 721, a determination is made as to whether the bit location has become negative. If so, a byte boundary has been crossed, and the byte address A and the bit address B are updated pursuant to the function block 723. Specifically, the byte address A is incremented by one, while the bit location B is updated to the result of B modulo 8.

If B is not less than zero, then processing continues with the function block 725. The byte address A is updated by adding (8*W) thereto, and the number of TILES N is decremented by one.

Pursuant to a decision block 727, a determination is made as to the number of TILES N has reached zero. If it has not, then control transfers back to the function block 710. If the number of TILES N has reached zero, which indicates that all of the complete tiles have been copied to the bitmap memory, control transfers to the function block 729. Pursuant to the function block 729, the height H' of the last partial TILE is calculated as follows:

$$H' = [(X2 - X1) MOD 8] + 1. \quad\quad (Eq. 7)$$

Pursuant to the function block 731, the last partial TILE is copied to the bitmap memory, and the endpoint block is copied to the bitmap memory.

After the functions of the function block 731 are accomplished, rasterization of a vector in octant C is complete.

Figure 19:
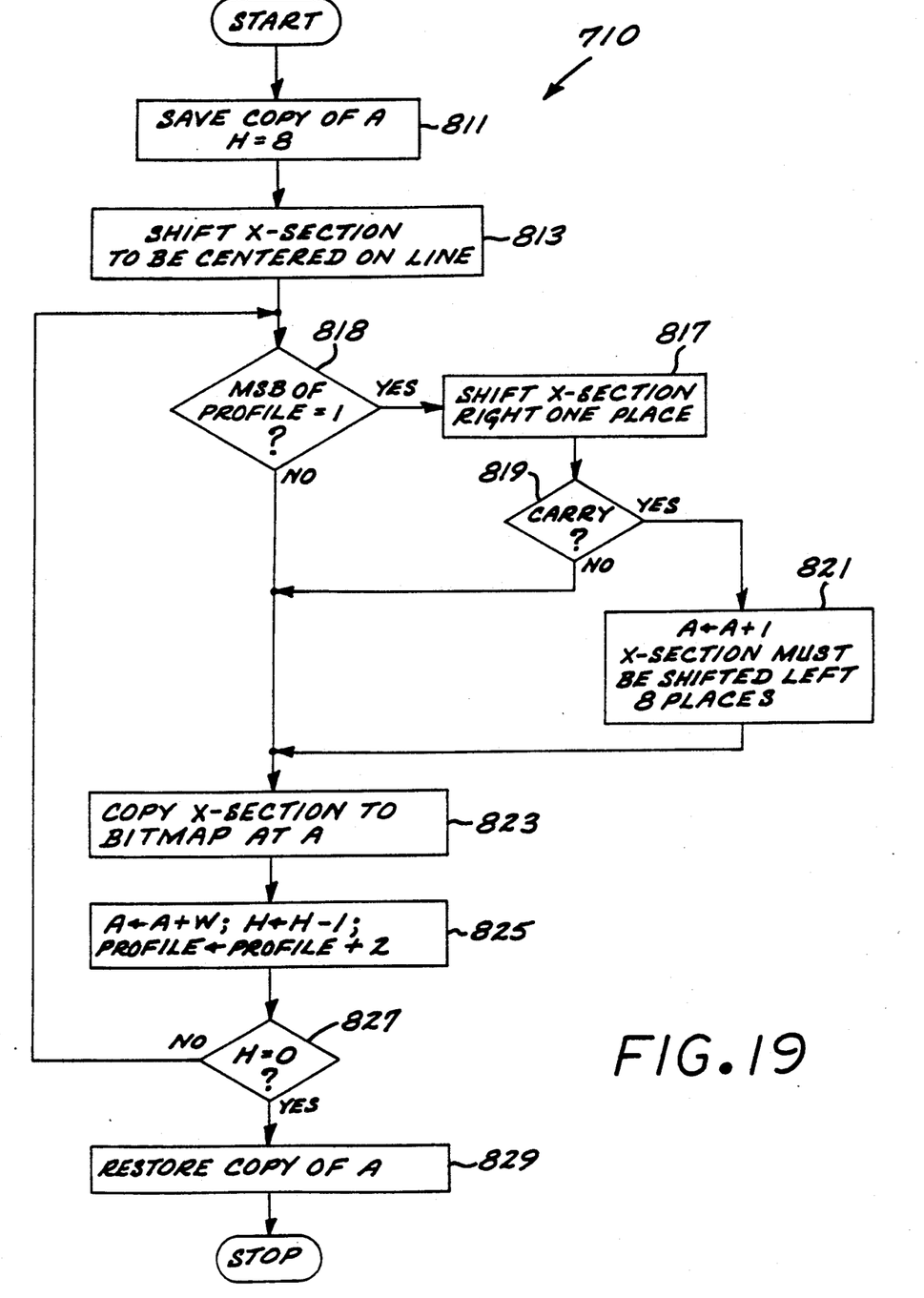
FIG. 19 sets forth a flow diagram illustrating in greater detail certain functions provided pursuant to the flow diagram of FIG. 18.

Referring now to FIG. 19, shown therein is a flow diagram in greater detail the functions provided pursuant to the function block 710 of FIG. 18. Pursuant to the function block 811, a copy of the current value of the byte address A is stored, and the height H is set to 8. Pursuant to the function block 813, the X-SECTION data is centered on the mathematical line pursuant to appropriate modulo arithmetic with reference to the location of the set bits of the X-SECTION data.

Pursuant to a decision block 815, a determination is made as to whether the most significant bit of the PROFILE data is equal to one. If it is not, control transfers to the function block 823. If the MSB of the PROFILE is one, indicating a shift, the X-SECTION data is shifted to the right by one position pursuant to the function block 817. Pursuant to a decision block 819, a determination is made whether there has been a carry (i.e., whether a one was shifted out of the X-SECTION data). If not, control transfer to the function 823. If there was a carry, which indicates crossing a byte boundary, the byte address A is updated by incrementing the current byte address by one pursuant to the function block 821. Also, the X-SECTION data including the carry is shifted to the left by eight positions. Control then transfers to the function block 823.

Pursuant to the function block 823, the X-SECTION data is copied to the bit map at the current byte address. Pursuant to the function block 825, the byte address A is updated by adding W thereto. (It should be recalled that W is the width of the raster in bytes.) Further, the height H is decremented by one; and the PROFILE data is added to itself, which is the equivalent shifting left by one position.

As indicated by a decision block 827, a determination is made as to whether the current value of the height H is equal to zero. If it is not, control transfers to the function block 815. If the current value of the height H is equal to zero, which indicates that the complete TILE has been copied, the byte address A is restored pursuant to the function 829 to the value saved pursuant to the function block 811. Rasterization of a TILE for a vector in octant C is now complete.

Referring now also to FIG. 18, the last partial TILE can be stored in the bitmap memory pursuant to a processing flow similar to that shown in FIG. 19, except that the last TILE height H' is used as the counter.

Vector-to-Raster Conversion of Lines in Octants A and B

Lines in octants A and B have mirror images in octants D and C, respectively, about a line parallel to the X axis. It should be appreciated that the distinction between a line in octant A and its mirror image in octant D is the sign of its slope, and more particularly the sign the difference between the Y coordinates of the end points. The same distinction applies to a line in the octant B and its mirror image in the octant C. Based upon these relationships, the foregoing processes for using the TILE information can be utilized to rasterize lines in octants A and B with the changes described herein.

As discussed previously, a line in octant C is drawn by centering the X-SECTION data on the mathematical line at the starting endpoint (X1,Y1) and then moving in the positive X direction, sequentially copying the X-SECTION data as shifted in the positive Y direction pursuant to the PROFILE data. It is contemplated that a line in octant B can be rasterized using the same TILE data as that used for its mirror image in octant C. This is achieved by centering the X-SECTION data on the mathematical line at the final endpoint (X2,Y2) and then moving in the negative X direction, sequentially copying the X-SECTION data as shifted in the positive Y direction pursuant to the PROFILE data. In the disclosed embodiments, the endpoints (X1,Y1) and (X2,Y2) are interchanged prior to the setup calculations of FIG. 11, and W is replaced with (−W) in the function block 725 of FIG. 18 and in the function 825 of FIG. 19. As previously defined, W is the width of the raster end bytes.

As discussed previously, a line in octant D is drawn by centering the PATTERN data on the mathematical line at the starting endpoint (X1,Y1) pursuant to the N_HALF_WIDTH and the P_HALF_WIDTH data and then moving in the positive Y direction, using the integer portion of the accumulator value ACC to determine the byte address A at which to copy the TILE selected using the fractional portion of the accumulator value ACC pursuant to the flow diagram of FIG. 13. It is contemplated that a line in octant A can be rasterized using the same PATTERN data used for its mirror image in octant D. This is achieved by centering the selected PATTERN data on the line at the final endpoint (X2,Y2) pursuant to N_HALF_WIDTH and P_HALF_WIDTH data and then moving in the negative Y direction. In the disclosed embodiments, the endpoints (X1,Y1) and (X2,Y2) are interchanged prior to the setup calculations of FIG. 11, and W with is replaced (−W) in the processes illustrated by the flow diagrams of FIGS. 13–16.

The foregoing has been a disclosure of specific embodiments of a technique for converting vector data to raster data which provides high speed and increases throughput. Still further, for high resolution systems, the additional pixels necessary to avoid jagged lines and to provide displayed lines of proper width are readily included with minimal decrease in speed. The conversion technique is readily implemented with a microprocessor based converter including existing microprocessor based vector to raster converter architectures.

Although the foregoing has been a description and illustration of specific embodiments of the invention, various modifications and changes thereto can be made by persons skilled in the art without departing from the scope and spirit of the invention as defined by the following claims.

What is claimed is:

1. A method for generating raster data for the raster display of a line having a slope, comprising the steps of:
   providing pre-computed line portion data representative of raster data for rectangular raster display areas for portions of lines of different slopes, wherein each rectangular raster display area comprises a two-dimensional array of pixels having parallel one-line cross-sections respectively comprising linearly adjacent pixels;
   dividing the predetermined line into a sequence of line portions; and
   generating raster data for the raster display for each of the line portions by selecting appropriate data for such line portions from the pre-computed line portion data.

2. The method of claim 1 wherein the pre-computed line portion data comprises (a) first pre-computed data for use in generating raster data for lines within a first range of slopes, and (b) second pre-computed data for use in generating raster data for lines within a second range of slopes.

3. The method of claim 2 wherein the first pre-computed data comprises PATTERN data which is the raster data for rectangular areas of the raster display of portions of lines.

4. The method of claim 3 wherein the second pre-computed data comprises (i) X-SECTION data, and (ii) SHIFT data indicative of the shifts to be applied to the X-SECTION data to produce raster data for the cross-sections of a rectangular raster display area of a portion of a line.

5. The method of claim 1 wherein the pre-computed line portion data comprises a plurality of TILES, each TILE being associated with two slopes and including:
   (a) PATTERN data for use with lines of the first slope associated with the TILE;
   (b) X-SECTION data for use with lines of the second slope associated with the TILE; and
   (c) SHIFT data for use in shifting the X-SECTION data of the TILE.

6. The method of claim 5 wherein the first and second slopes associated with each TILE are the inverse of one another.

7. The method of claim 6 wherein the TILES are stored in a look-up table.

8. The method of claim 7 wherein each cross-section comprises a row of pixels.

9. A method for generating raster data for the raster display of a line having a slope, comprising the steps of:
   providing pre-computed TILE data representative of raster data for rectangular raster display areas for portions of lines of different slopes, wherein each rectangular raster display area comprises a two-dimensional array of pixels having parallel one-line cross-sections respectively comprising linearly adjacent pixels, each TILE being associated with first and second slopes and including:
   (a) PATTERN data utilized for lines of the first slope associated with the TILE and comprising raster data for the rectangular raster display area of a line portion;
   (b) X-SECTION data utilized for lines of the second slope associated with the TILE;
   (c) SHIFT data indicative of the shifts to be applied to the X-SECTION data to produce raster data for the cross-sections of the rectangular raster display area of a line portion;
   dividing the predetermined line into a sequence of line portions; and
   generating raster data for the raster display for each of the line portions by selecting appropriate data in such line portions from the pre-computed TILE data.

10. The method of claim 9 wherein the first and second slopes associated with each TILE are the inverse of one another.

11. The method of claim 10 wherein the TILES are stored in a look-up table.

12. The method of claim 1 wherein each cross-section comprises a row of pixels.

* * * * *